W. R. KOESTERER.
DIRIGIBLE HEADLIGHT.
APPLICATION FILED APR. 29, 1921.

1,431,820.

Patented Oct. 10, 1922.
2 SHEETS—SHEET 1.

Inventor
W. R. Koesterer
By [signature]
Attorney

W. R. KOESTERER.
DIRIGIBLE HEADLIGHT.
APPLICATION FILED APR. 29, 1921.
1,431,820.
Patented Oct. 10, 1922.
2 SHEETS—SHEET 2.
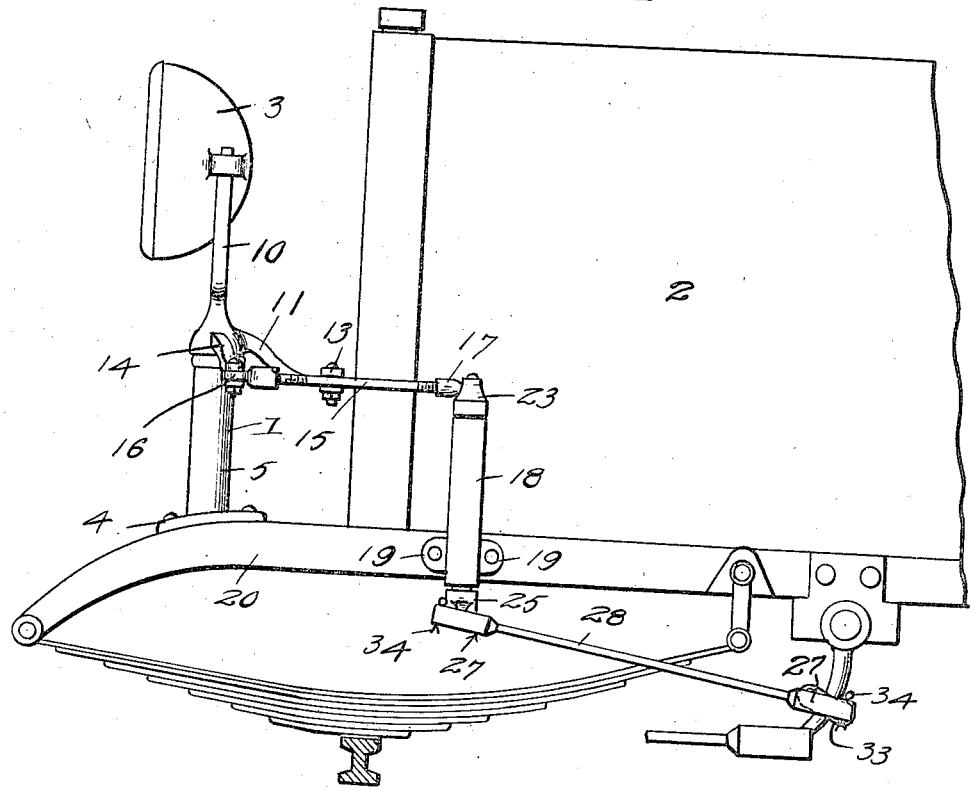
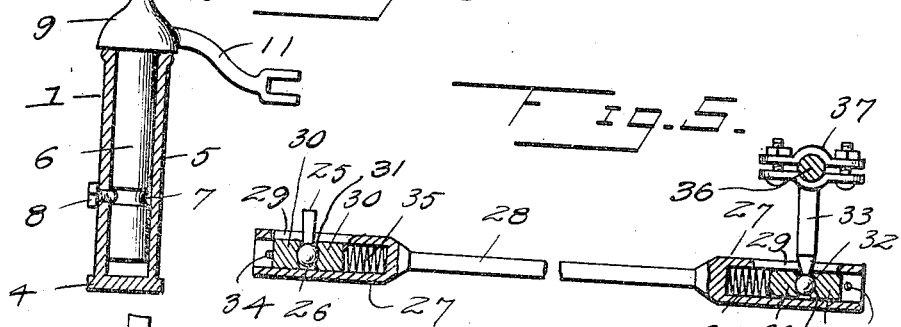
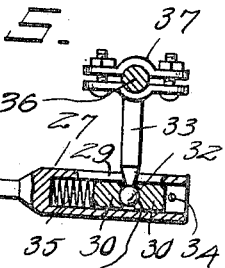
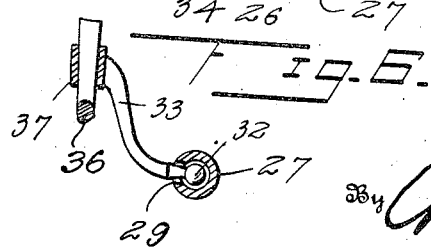
Inventor
W. R. Koesterer
By [signature]
Attorney Patented Oct. 10, 1922.

1,431,820

UNITED STATES PATENT OFFICE.

WILLIAM R. KOESTERER, OF FREEBURG, ILLINOIS.

DIRIGIBLE HEADLIGHT.

Application filed April 29, 1921. Serial No. 465,383.

*To all whom it may concern:*

Be it known that I, WILLIAM R. KOESTERER, a citizen of the United States, residing at Freeburg, in the county of St. Clair and State of Illinois, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in dirigible headlights for motor vehicles adapted to always illuminate the roadway either when traveling in a straight course or on a curve and has for its primary object the provision of a device of the above stated character, which will be actuated by the steering mechanism of the vehicle and which will offer the least amount of resistance to said steering mechanism thereby permitting the latter to be operated with ease.

Another object of this invention is the provision of a dirigible headlight of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1:
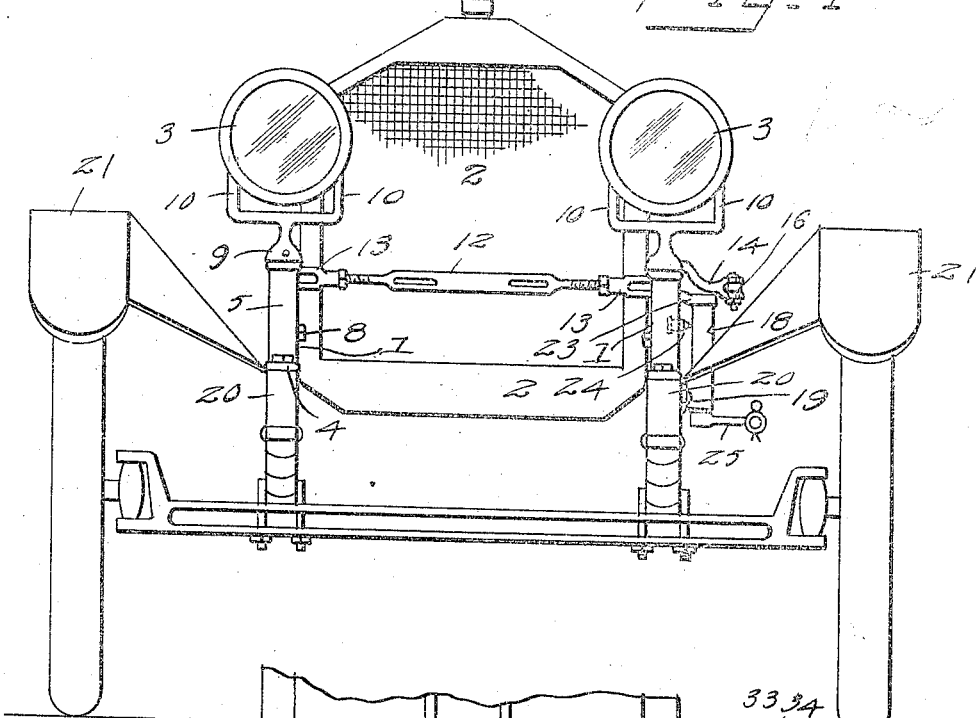
Figure 2:
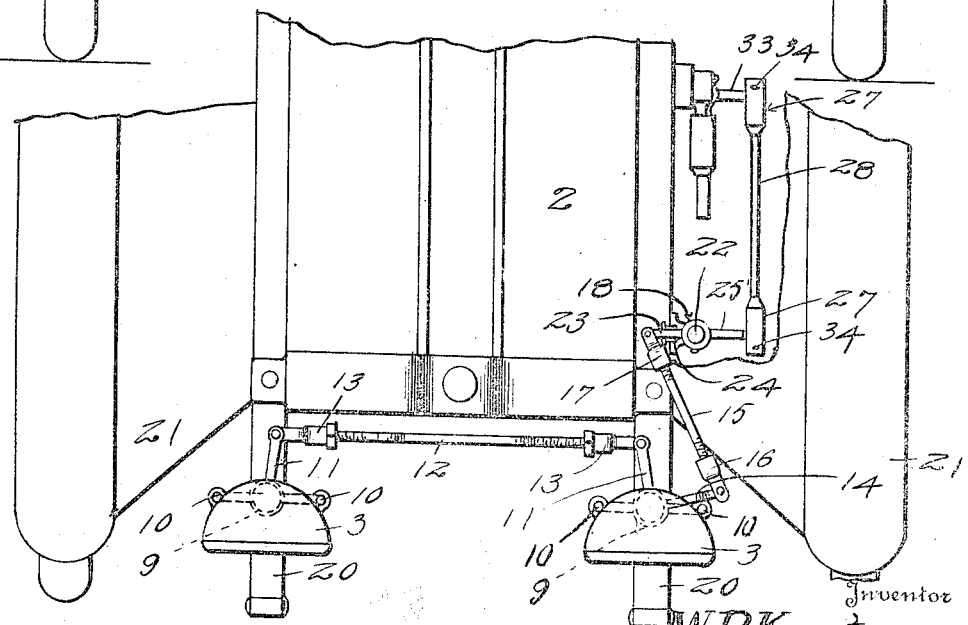

Figure 1 is a front elevation, illustrating a dirigible headlight constructed in accordance with my invention and applied to a fragmentary portion of a motor vehicle, Figure 2 is a horizontal sectional view illustrating the same, Figure 3 is a side elevation partly in section illustrating the means of transmitting movement from the steering mechanism to the headlights, Figure 4 is a vertical sectional view, illustrating one of the mountings for the headlights, Figure 5 is a sectional view illustrating a movement transmitting bar, Figure 6 is a sectional view illustrating the means for connecting the bar to a steering mechanism.

Referring in detail to the drawings, the numeral 1 indicate mountings located at the front end of an automobile 2 for the purpose of supporting headlights 3 and including attaching bases 4 bolted or otherwise secured to the automobile 2 and have formed thereon tubular housings 5 to rotatably support lamp standards 6 and the lower ends of the latter are provided with annular grooves 7 to be engaged by set screws 8 carried by said housings for the purpose of preventing accidental withdrawal of the lamp standards from said housings but will permit the former to rotate freely within said housings. The lamp standards have formed thereon shoulders 9 that rest upon the upper ends of the housings for the purpose of limiting the downward movement of the lamp standards within said housings and the upper ends of the standards terminate in forks 10 to which the headlights 3 are secured. Lubricant may be placed within the housings 5 for the purpose of permitting the lamp standards 6 to rotate or turn therein with the minimum amount of friction. Rearwardly extending arms 11 are formed on the lamp standards and are pivotally connected to the ends of a connecting rod 12 by means of forks 13. The forks 13 are adjustably secured to the ends of the connecting rod 12 for the purpose of adjusting the headlights in respect to each other. The intermediate portion of the connecting rod 12 is flattened to form an attaching bracket for a license tag or the like. One of the lamp standards is provided with an arm 14 which extends at right angles to the arm 11 of said standard and is pivotally connected to one end of a connecting rod 15 by means of a fork 16. The connecting rod 15 is also equipped with a fork 17 and the forks 16 and 17 are adjustably connected to the ends of the connecting rod 15 for the purpose of varying the throw of the headlights by the steering mechanism.

A tubular casing 18 has formed thereon attaching brackets 19 which are secured to the frame 20 of the automobile 2 and said casing 18 extends upwardly through one of the front mud guards or fenders 21 of the automobile 2 and has journaled therein a shaft 22 which projects beyond each end of said casing and has secured to its upper end an arm 23 which is pivotally secured to the fork 17 of the connecting rod 15. The casing 18 is furnished with lubricant by means of a lubricating cup 24 so as to permit the shaft 22 to turn within said casing with the minimum amount of friction. An arm 25 is secured to the lower end of the shaft 22 and is located underneath the fender or mud guard 21 of the automobile and has formed upon its end a ball or sphere 26 to be received by a socket 27 at one end of a movement transmitting bar 28. The ends of the bar 28 are enlarged and are of hollow formation and provided with slots 29 in the sides thereof. Pairs of bearing blocks 30 are located within the hollow enlarged end of the bar 28 and have their opposing faces recessed as illustrated at 31 for the purpose of receiving the ball 26 on the arm 25 and the ball 32 on the arm 33. The outer block of each pair of blocks 30 is secured to the bar 28 by cotter pins 34, while the inner blocks of said pairs of blocks seat against springs 35 so as to permit a slight relative movement between the bar 28 and the arms 25 and 33 in case an excessive strain is placed on said bar. The outer blocks of the pairs of blocks being secured to the bar 28 by cotter pins permits ready detachment of the bar 28 from either of the arms 25 or 33. The arm 33 is detachably secured to a rod 36 forming a part of the steering mechanism of the automobile 2 by means of a clamp 37 and said rod is adapted to be moved backward and forward in respect to the automobile by the steering mechanism when turning to the right or left and this movement is adapted to rotate the shaft 22 within the casing 18 through the medium of the movement transmitting bar 28 and the turning movement of the shaft 22 imparts a similar movement to the headlights by the medium of the connecting rods 15 and 12.

While I have shown and described the preferred embodiment of my invention, it will be understood that minor changes in construction, combination, and arrangement of parts may be made without departing from the spirit and scope of the invention as claimed.

Having thus described my invention, what I claim is:

1. In combination, a motor vehicle having a steering mechanism, headlights rotatably secured to the automobile, means securing the headlights together, a casing secured to the automobile and extending through one of its mud guards, a shaft journaled in said casing, a crank arm secured to each end of said shaft and extending in opposite directions, a movment transmitting bar connected to one of said cranks, and having connection at its other end with the steering mechanism, a connecting rod secured to the other of said cranks, and said connecting rod connected to a crank carried by a headlight.

2. In combination, a motor vehicle having a steering mechanism, headlights rotatably secured to the automobile, adjustable means connecting the headlights together, a casing secured to the automobile and extending through one of its mud guards, a shaft journaled in said casing, a crank arm secured to each end of said shaft and extending in opposite directions, a movement transmitting rod pivotally and yieldingly connected to one of said cranks, means connecting the other end of said movement transmitting rod to the steering mechanism, said last named means being pivotally and yieldingly connected to said movement transmitting rod, a connecting rod carrying adjustable forked connecting means at either end, said connecting rod adapted to have one end secured to the other of said cranks, and said connecting rod having its other end connected to the crank arm carried by a headlight.

In testimony whereof I affix my signature in presence of two witnesses.

WILLIAM R. KOESTERER.

Witnesses:
R. E. HAMILL,
MINNIE HOLST.